United States Patent [19]

Becker et al.

[11] Patent Number: 4,847,040
[45] Date of Patent: Jul. 11, 1989

[54] NUCLEAR POWER PLANT WITH A GAS COOLED HIGH TEMPERATURE REACTOR

[75] Inventors: Gerhard Becker, Mannheim; H. Guenter Gross, Heidelberg; Josef Schoening, Hambruecken, all of Fed. Rep. of Germany

[73] Assignee: Hochtemperatur-Reaktorbau GmbH, Fed. Rep. of Germany

[21] Appl. No.: 146,706

[22] Filed: Jan. 21, 1988

[30] Foreign Application Priority Data

Jan. 21, 1987 [DE] Fed. Rep. of Germany ....... 3701604

[51] Int. Cl.$^4$ ............ G21C 15/18; G21C 15/12; G21C 11/08; G21C 15/24
[52] U.S. Cl. .................. 376/299; 376/277; 376/289
[58] Field of Search .......... 376/277, 289, 296, 298, 376/299, 381

[56] References Cited

U.S. PATENT DOCUMENTS

| | | |
|---|---|---|
| 4,554,129 | 11/1985 | Peinado et al. |
| 4,689,194 | 8/1987 | Wachholz et al. ........ 376/299 |
| 4,696,791 | 9/1987 | Straub ........................ 376/299 |
| 4,725,400 | 2/1988 | Elter et al. .................. 376/299 |
| 4,752,439 | 6/1988 | Elter et al. .................. 376/299 |
| 4,753,771 | 6/1988 | Conway et al. ............ 376/299 |
| 4,756,872 | 7/1988 | Schöning et al. .......... 376/299 |
| 4,761,260 | 8/1988 | Schmitt et al. ............. 376/299 |
| 4,765,946 | 8/1988 | Dagard et al. ............. 376/299 |

FOREIGN PATENT DOCUMENTS 3121377 3/1981 Fed. Rep. of Germany.
3335268 4/1985 Fed. Rep. of Germany.

Primary Examiner—Charles T. Jordan
Assistant Examiner—Richard W. Wendtland
Attorney, Agent, or Firm—Robert J. Koch

[57] ABSTRACT

A nuclear power plant with a gas cooled high temperature reactor, installed in a prestressed concrete pressure vessel with the operational and decay heat removal systems. The prestressed concrete pressure vessel has a thermal protection system, with a thermal insulating layer and a liner cooling system. The liner cooling system, which is includes water carrying cooling pipes, which along with intermediate heat exchangers and cooling water pumps make up a closed intermediate cooling loop used for removal of the decay heat in case a failure of the decay heat removal systems. The elements of the invention assure an adequate water flow for the removal of decay heat in the liner cooling system in any situation, i.e. such that the decay heat may also be removed by natural convection. These element insure a sufficient driving pressure differences and minimize pressure losses in the intermediate cooling loop.

16 Claims, 6 Drawing Sheets

NUCLEAR POWER PLANT WITH A GAS COOLED HIGH TEMPERATURE REACTOR

BACKGROUND OF THE INVENTION

1. Field of the Invention

The invention relates to a nuclear power plant with a gas cooled high temperature reactor, and more particularly to a reactor with a spherical fuel element core and a prestressed concrete pressure vessel surrounding the high temperature reactor. The reactor cavity is clad with a liner and contains a plurality of heat exchangers, preferably steam generators for operational heat removal. At least two auxiliary heat exchangers for decay heat removal are also arranged in the reactor cavity. The prestressed concrete pressure vessel has a thermal protection system including a thermal insulating layer and a liner cooling system comprising a plurality of cooling pipes through which water flows and which, together with intermediate heat exchangers and cooling water pumps, a closed intermediate cooling loop used for the removal of the decay heat in case of an auxiliary heat exchanger failure.

2. Description of the Related Technology

U.S. Pat. No. 4,554,129 shows a gas cooled nuclear reactor installed in the cavity of a prestressed concrete pressure vessel. The heat generated in the reactor core is transferred to several heat exchangers located in the cavity above the nuclear reactor. No auxiliary heat exchangers are provided for the removal of the decay heat. Decay heat is removed by a liner cooling system made up of cooling pipes welded to the cavity liner inlet and return lines connected to the cooling pipes and a plurality of circulating pumps. Heat is transported from the reactor core to the liner cooling system by central pipes provided inside the heat exchanger and by shut-off valves closed in normal operation in a annular space bordering on the liner. A natural downward directed flow of heat is established in the annular space, so that all areas of the liner are exposed to the cooling gas.

DE-OS No. 33 35 268 shows a high temperature reactor with spherical fuel elements. Steam generators and blowers for operational removal of heat and auxiliary cooling systems for the decay heat removal in case of accidents are located together with the other components of the primary loop in the cavity of the prestressed concrete pressure vessel. The cavity is provided with a liner exhibiting a cooling system. This liner cooling system may be used for the removal of the decay heat, should the auxiliary cooling systems fail. It has also been proposed to conduct the decay heat to the liner cooling system by natural convection without coolant loss in case of accidents.

DE-OS No. 31 21 377 shows a liner cooling system for a prestressed concrete pressure vessel intended to house a nuclear reactor and containing an interior thermal insulating layer. The liner cooling system is redundant; i.e., it consists of several mutually independent water circulating loops.

SUMMARY OF THE INVENTION

It is an object of the invention to provide a nuclear power plant with an adequate mass flow of water in the liner cooling system for removal of decay heat in any situation.

According to the invention, this object is attained by the following characteristics:

(a) Arranging intermediate heat exchangers above the upper edge of the prestressed concrete pressure vessel (b) Dividing the liner cooling system into several cooling pipe zones according to vertical or height positions wherein at least one cooling pipe zone in an upper zone range (by height) is always connected to a zone in a lower location;

(c) Arranging a supplemental pump connected to an emergency power system in parallel with each primary cooling water pump, where the supplemental pumps may have a significantly lower capacity;

(d) Providing every cooling water pump with a by-pass line with an actively or passively controlled check valve, where the check valve opens if the cooling water pump is inoperative and;

(e) Providing an installation for removal of the decay heat by natural convection in case of a failure of the intermediate heat exchangers connected to the liner cooling system.

The natural convection decay heat removal system includes:

a water reservoir with a nitrogen cushion connected to the forward or feed line of the liner cooling system, a vertical boiling tube, placed in the intermediate loop, connected to the liner cooling system return line and located geodesically higher than the liner cooling system, a water separator located in the intermediate cooling loop, connected to the vertical boiling tube and including a nitrogen cushion, and a safety blow-off valve connected to the water separator.

Adequate flow through the liner cooling system requires an appropriate pressure forcing the water through the system. The amount of pressure is referred to as a "driving pressure difference" or $\Delta P_{tr}$.

The decisive factor for the presence of an adequately high water mass flow in the liner cooling system without the use of active aggregates, such as pumps or blowers, is a sufficiently large driving pressure difference $\Delta P_{tr}$ in the intermediate cooling loop. The driving pressure difference is proportional to the product $\Delta \rho \cdot g \cdot H$ ($\Delta \rho$ = difference in density, H = height). According to invention, the necessary driving pressure difference $\Delta P_{tr}$ is provided by acting on the factor H, i.e. by the geometric layout of the intermediate heat exchangers, and by an appropriate interconnection of cooling pipe zones of differing heights. The latter measure is required, as the reactor protection building enclosing the prestressed concrete pressure vessel only has a limited height available for the intermediate heat exchangers.

According to the invention, in case the cooling water pumps are not operating due to a power failure, the necessary driving pressure difference $\Delta P_{tr}$ is assured by supplemental pumps connected in parallel to the cooling water pumps and operated with emergency power. No problems arise from the connection to the emergency power system as the supplemental pumps have capacities lower by one to two orders of magnitude than the normal operation cooling water pumps in view of a permissibly higher cooling water heating range and correspondingly lower water flow rates.

The reduction of pressure losses in the intermediate cooling loops leads to an increased water flow rate. High pressure losses can occur in case of a failure of a the cooling water pumps; that is exactly a situation where an adequate flow of water is absolutely necessary since heat may be removed from the liner cooling system only by natural convection. High pressure losses of inactive cooling water pumps are reduced to a minimum by the proposed bypass lines with check valves.

In case the intermediate heat exchangers of the intermediate cooling loop fail, a device connected to the liner cooling system is activated, whereby the decay heat is removed by the heat of evaporation contained in a water reservoir through a safety blow-off valve.

The advantage of the invention lies in that decay heat can be removed safely even in case of a failure of the auxiliary heat exchangers and the intermediate heat exchangers and also in the case of a power failure, so that any impermissible heating of the primary loop components is prevented and the risk of the release of activities (radioactivity) reduced.

The higher density differences of cooling water present in the liner cooling system may be utilized advantageously to increase the water flow rate by natural convection in the rare case of accidents, as a result of the high, acceptable, concrete and liner temperatures during removal of decay heat.

An increase in temperature of 200°-300° C. over normal operating temperature due the thermal capacity. The temperature rise will result in a considerable rise in density difference $\Delta P_{tr}$ of the cooling water above the normal operation level. The driving pressure difference $\Delta P_{tr}$ is also raised in the process. In a single phase heat removal process in the liner cooling system the temperature of the cooling water may be raised to slightly below the boiling point. A further increase of $\Delta \rho$ may be obtained by two-phase heat removal (bubble boiling) in the liner cooling system.

An increase in the flow of water in the liner cooling system may be achieved by reducing pressure losses in the intermediate cooling loop. Pressure losses in the operation of decay heat removal is defined by:

$$\Delta P_{NWA} = \Delta P_N \left(\frac{\Delta \delta_N}{\Delta \delta_{NWA}}\right)^2 \times \left(\frac{Q_{NWA}}{Q_N}\right)^2 + \Delta P_P$$

wherein
N=nominal operation
NWA=decay heat removal operation
$\Delta \delta$=heating range of the cooling water
Q=volume of heat removed by the liner cooling system
$\Delta P_P$=pressure loss of the inactive cooling water pumps.

It follows from this relationship that it is advantageous to choose a high heating range for the cooling water (to the boiling temperature or slightly thereunder). The ratio of the volumes of heat removed in nominal operation and in a decay heat removal operations are determined by the temperatures generated.

The nominal pressure losses $\Delta P_N$ may be reduced by the appropriate layout of the liner cooling system and choice of the components of the intermediate cooling loop. The following measures may be effected to reduce nominal pressure loss extensive equalization of pressure losses in the individual cooling pipes, in particular reduction of peak values, or selection of intermediate heat exchangers with low pressure losses on the liner cooling system side.

The composition of different cooling pipe zones of the liner cooling system may be established advantageously by direct coupling during the layout of the liner cooling system. Alternatively, the cooling pipe zones may be connected to each other in the decay heat removal operation by short circuiting the forward and return lines of the zones by externally accessible valves. The valves may be manually actuated. This so-called external coupling is taken into consideration in the layout of the liner cooling system.

Check valves located in the cooling water pump bypass lines may be actuated in a number of ways: actively, controlled by the speed of the cooling water pump involved (for example, the check valve concerned remains closed at pump speed of equal to or higher than 100 rpm and opens if the velocity drops below that rate), or passively by the pressure difference applied to the cooling water pump involved. In the latter case the check valve concerned, which in normal operation is closed, may be opened by its own weight or the release of a spring.

According to a further embodiment of the invention the decay heat removal capacity of the liner cooling system by natural and forced convection must be optimized against the thermal resistance of the thermal insulating layer so that the maximum permissible liner, fuel element and reactor installation temperature is not exceeded.

Heat resistance corresponding to insulation thickness of the thermal insulating layer decisively affects a rise in temperature of structural parts located within the prestressed concrete pressure vessel in case of failure of decay heat removal by the auxiliary heat exchangers and the liner cooling system. The aforementioned component temperatures are calculated as a function of the thermal resistivity of the thermal insulating layer during layout of the thermal insulating layer for the case of a "failure of the decay heat removal installation". The optimum is achieved when the same safety margin from the maximally permissible limiting temperature is established for all of the structural components.

The two extreme cases described below serve to demonstrate this condition in case of failure of the auxiliary heat exchangers and the removal of the decay heat through natural convection in the liner cooling system this is also valid for forced convection, decay heat removal by the liner cooling system.

If the insulating layer thickness is inadequate:

Excessive heat is transported to the liner and in the liner cooling system and leads to exceeding the maximum permissible liner and concrete temperatures, however, in view of the effective removal of heat from the primary loop through the liner cooling system the temperature of the fuel elements and of the reactor installations remain far below its limiting value.

If the thickness of the thermal insulating layer is too large:

Inadequate decay heat removal from the primary loop results in fuel element and the reactor installation temperatures exceeding their failure limits due to an excessive cooling gas temperature while the liner temperature remains far below the permissible limiting value (and the heat removal capacity of the liner cooling system remains unutilized).

According to a feature of the invention an optimization is effected for the liner cooling system alone (i.e. not for the entire thermal protection system) relative to the maximum removal of decay heat by natural convection and of a minimalization of the liner temperature respectively. The parameters used in for this optimization are the cooling pipe diameter and the cooling pipe spacing. The flow of cooling water and thus the amount of heat that may be removed in a natural convection liner cooling system depends on the choice of the cooling pipe diameter and the existing cooling pipe spacing. The flow of cooling water in a liner cooling system (flow per m² of cooling water) is predetermined by the heating range. In order to increase the natural convection flow of the cooling pipe cross section must be enlarged proportionally to the spacing of the cooling pipes. This measure is limited by the maximum temperature of the liner which rises with increasing cooling pipe spacing. A variation of the cooling pipe cross section and the cooling pipe spacing leads to optimization of minimizing the liner temperature and to maximizing the cooling water flow and liner cooling system natural convection heat removal capacity resulting in a reduction of the residual risk in case of a decay heat removal failure.

This optimization leads to a reduction in liner cooling pipe spacing (while maintaining cooling pipe diameter) or an increase in cooling pipe diameter and a correspondingly larger cooling pipe spacing or a combination of the two measures.

Advantageously, the installation for the removal of decay heat, in case of a failure of the intermediate heat exchangers, the pressure of the nitrogen cushion in the water separator and the actuating pressure of the safety blow-off valve may be correlated in a manner such that heat removal from the intermediate cooling loop to a predetermined cooling water temperature is effected initially in a single phase range and passes into a two-phase range only when the saturation pressure in the water separator attains the actuating pressure the safety blow-off valve. Additionally the water reservoir may have an open configuration and be located geodesically high enough so that upon a rise of the pressure in the intermediate cooling loop to the actuating pressure of the safety blow-off valve a blow-off through the open water reservoir is prevented. Alternatively the water container may have a closed configuration and is pressure connects by a connecting line to the water separator and that its geodesic height is determined so that the same water level may be established in the water separator and the water reservoir.

DETAILED DESCRIPTION OF THE PREFERRED EMBODIMENT

Figure 1:
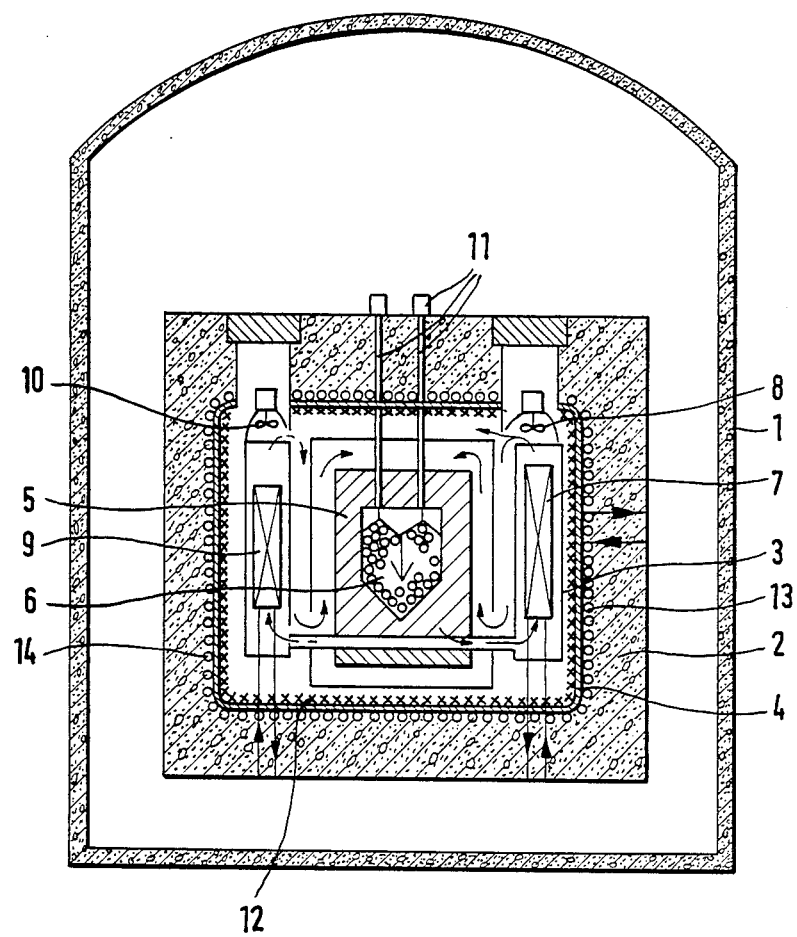
FIG. 1 shows a longitudinal section of a nuclear power plant with a high temperature reactor but without the intermediate cooling loop.

FIG. 1 shows a reactor protection building 1 enclosing a prestressed concrete pressure vessel 2. The pressure vessel defines a reactor cavity 3 clad with a metal liner 4, containing a gas cooled high temperature reactor 5. The core 6 of the reactor contains spherical fuel elements. The reactor cavity 3 also contains several steam generators 7 for operational heat removal, and at least two auxiliary heat exchangers 9 for removal of decay heat. The cooling gas, which flows downward through the reactor core is circulated in normal operation by blowers 8. Blowers 10 circulate the cooling gas in the decay heat removal mode.

A shutdown system 11 is provided for control and shutdown of the high temperature reactor 5. The shutdown may include a plurality of absorber rods insertable into the reactor core 6.

A thermal protection system made up of a thermal insulating layer 12 and a liner cooling system 13 is arranged on the inside of the prestressed concrete pressure vessel 2. The liner cooling system contains a plurality of cooling pipes 14. Water flows through the cooling pipes which are part of a closed intermediate cooling loop 15 (shown in subsequent figures). The liner cooling system 13 and the intermediate cooling loop 15 are laid out in a manner and have sufficient capacity such that they are capable of removing all of th decay heat in case of a failure of the auxiliary heat exchanger 9.

Figure 2:
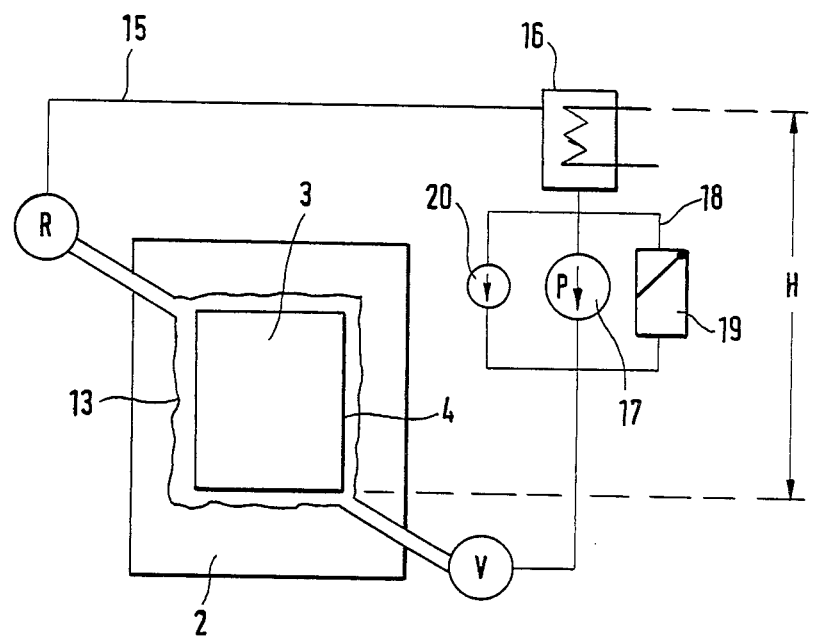
FIG. 2 shows schematically a liner cooling system of the high temperature reactor with an intermediate cooling loop.

FIG. 2 shows the prestressed concrete pressure vessel 2 with the (highly schematically drawn) liner cooling system 13 and the intermediate cooling loop 15, connected by a forward or feed line V and a return line R connect the intermediate cooling loop 15 to the liner cooling system 13. The intermediate loop 15 further includes a plurality of intermediate heat exchangers 16 each with a corresponding cooling water pump 17 (only one of each is shown in the figures). The intermediate heat exchanger 16 is located in a position elevated above the upper edge of the prestressed concrete pressure vessel 2 in order to have available a sufficiently large driving pressure difference. The driving pressure is a function of the height H.

A bypass line 18 is provided for every cooling water pump 17. A check valve 19 is located in the bypass line. The check valve may be actively controlled by the speed of the pump. The valve may be set so that it opens at a number of rotational speed equal to or less than 100 rpm.

A supplemental pump 20 may be connected in parallel with every cooling water pump 17 in order to assure an adequate driving pressure difference even in case of a power failure (resulting in the deactivation of the cooling water pump 17). The supplemental pump may have a significantly lower capacity than the main pump and is connected to the emergency power system.

Figure 3:
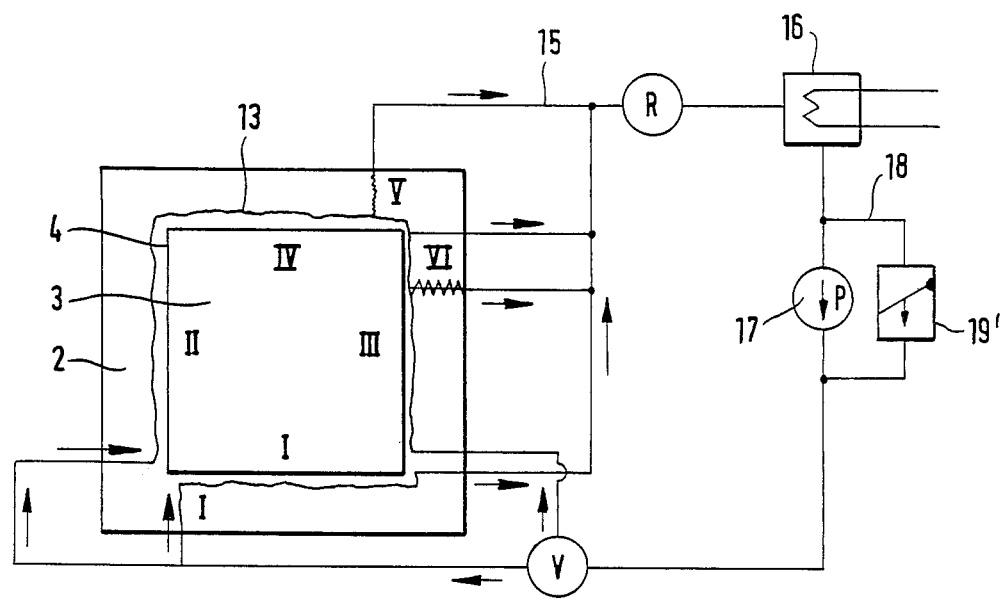
FIG. 3 shows the liner cooling system of the high temperature reactor and the intermediate cooling loop with the spacing in the cooling pipe zones and the interconnection of different cooling pipe zones.
Figure 4:
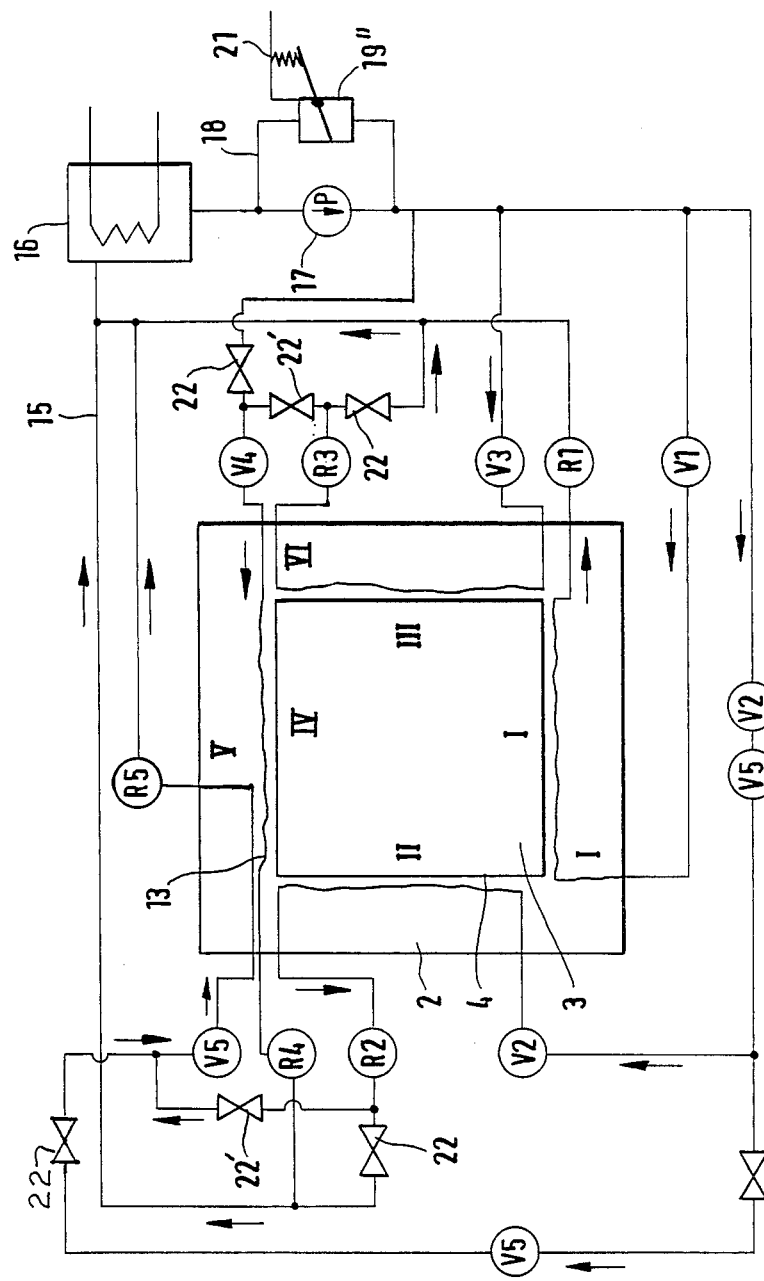
FIG. 4 shows a variant of the interconnection of the cooling pipe zones shown in FIG. 3.

The liner cooling system 13 is divided into several cooling pipe zones of differing elevations available for the creation of a driving pressure difference within the protective reactor building. At least one cooling pipe zone in a lower height location is connected to at least one zone in a higher location. Each of FIG. 3 and 4 shows an alternative of the interconnection of different cooling pipe zones.

The liner cooling system is divided into individual zones. In order to facilitate natural convection through the various zones it is important that zones of differing elevations be connected serially rather than in parallel. As can be seen in FIG. 2 the height differential between a roof reflector zone and the heat exchanger may be minimal due to required layout within the pressure vessel. By connecting the roof reflector zone to a zone of lower elevation, such as a side reflector zone, the effective height differential is greatly increased (to H) thereby increasing the driving pressure to the roof zone and facilitating natural convection when needed.

Driving pressure and thus natural convection is further facilitated by a vertical "hot-strand". If the height of the "hot-strand" is insufficient there will not be an adequate driving pressure. For this reason at least the horizontal roof reflector zones are serially coupled to lateral wall zones thus establishing a sufficient "hot-strand" to drive natural convection.

During normal operation of the facility the parallel zone layout enhances performance by favorable impacting design considerations, i.e. redundancy, reliability, lowering pressure differential etc.

FIG. 3 shows direct coupling of individual cooling pipe zones, i.e. the interconnection of the cooling pipe zones has been effected in the course of the layout of the liner cooling system 13. As seen in FIG. 3, the liner cooling system 13 is divided into six zones I ... VI, of which zones IV and V impact the roof with a lower $\Delta P_{tr}$, the cooling pipe zones IV and are coupled with the cooling pipe zones II and III.

In this embodiment the check valve 19' of the intermediate cooling loop 15 is controlled passively by the pressure difference applied to the cooling water pump 17. For the purpose, the check valve 19' is moved into its closed position upon the start-up of the cooling water pump 17 by a single electromagnetic impulse (for example the starting current) and remains closed due to the aforementioned pressure difference in normal operation. In case of a failure of the cooling water pump 17, the pressure difference is reduced approximately to 0, and the check valve 19' is opened without any additional energy by gravitational force due to its own weight only.

FIG. 4 shows an embodiment where cooling pipe zones I ... VI are interconnected by valves 22 and 22' accessible from the outside. A passively controlled check valve 19" is provided in the intermediate cooling loop 15. This check valve may be closed by an electromagnetic impulse and remains in this position under the effect of the pressure difference applied to the cooling water pump 17. However, the check valve 19" is opened here in case of the failure of the cooling water pump 17 not by gravity, but by a tension spring 21, which is stressed when the valve is close and is released when the pressure difference is eliminated.

In the embodiment shown in FIG. 4 the liner cooling system 13 is laid out in the planning stage so that it is possible to short-circuit the feed lines V1, V2 ... V5 and the return lines R1, R2 ... R5 of the cooling pipe zones concerned in case of an accident, by means of the valves 22, 22'. Thus for example the cooling pipe zones II and V or III and IV, which in normal operation are supplied individually, may be interconnected by valve actuation in the following manner:

interconnection of cooling pipe zones II and V by connecting the return R2 and the forward line V5 and interconnection of the cooling pipe zone III and IV by connecting R3 with V4.

During normal operation all valves 22 are open and valves 22' are closed. In order to establish natural convection valves 22 are closed and 22' are opened thereby establishing serial connection between zones II and V, and zones II and IV.

Figure 5:
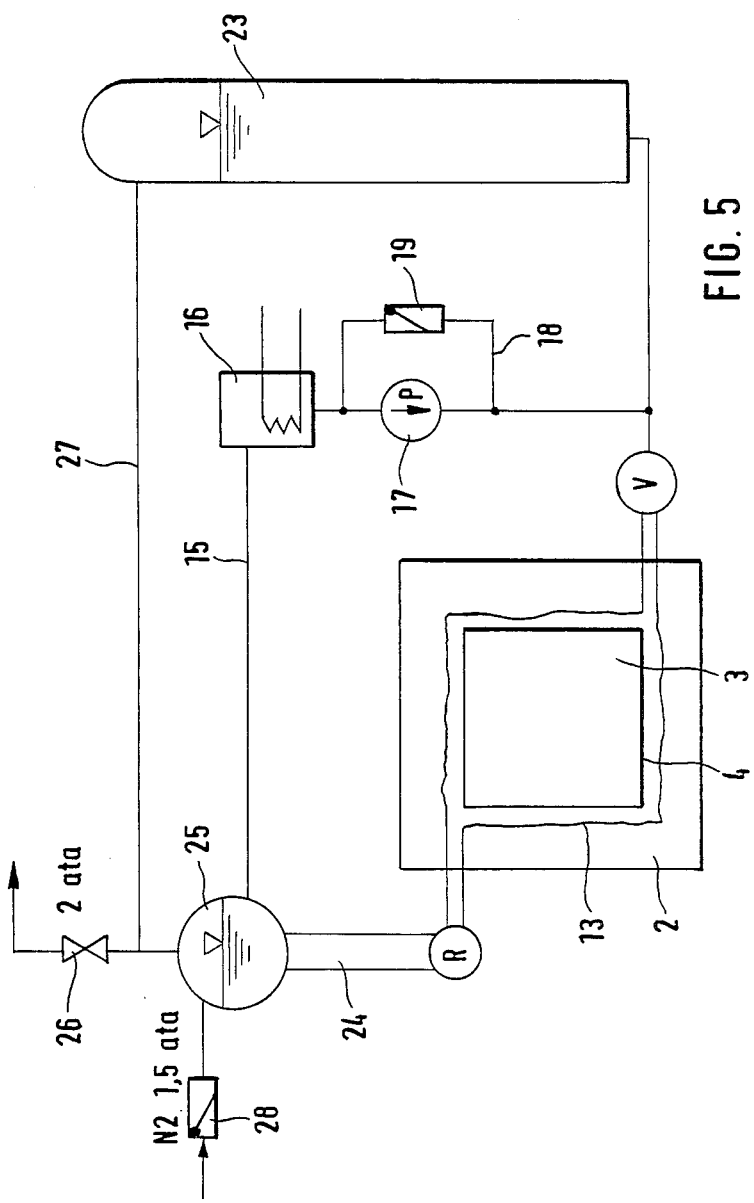
FIG. 5 shows the liner cooling system with the intermediate cooling loop and a device for the removal of decay heat by natural convection.

FIG. 5 shows an installation for decay heat removal by natural convection, in addition to the liner cooling system 13 with the intermediate loop 15. The natural convection installation is actuated when the intermediate heat exchangers fail. The installation is made up of a water reservoir 23 with a nitrogen cushion, connected with the forward line V of the liner cooling system 13, a vertical boiling tube 24 located in the intermediate cooling loop 15 and being placed geodesically higher than the liner cooling system 13 and connected to the return line R of the liner cooling system 13, a water separator 25 with a nitrogen cushion, also located in the intermediate cooling loop 15 and connected to the vertical boiling tube 24, and a safety blow-off valve 26 mounted on the water separator 25. The nitrogen cushion in the water reservoir 23 and the water separator 25 has a pressure of $\geq 1.5$ bar.

Figure 6:
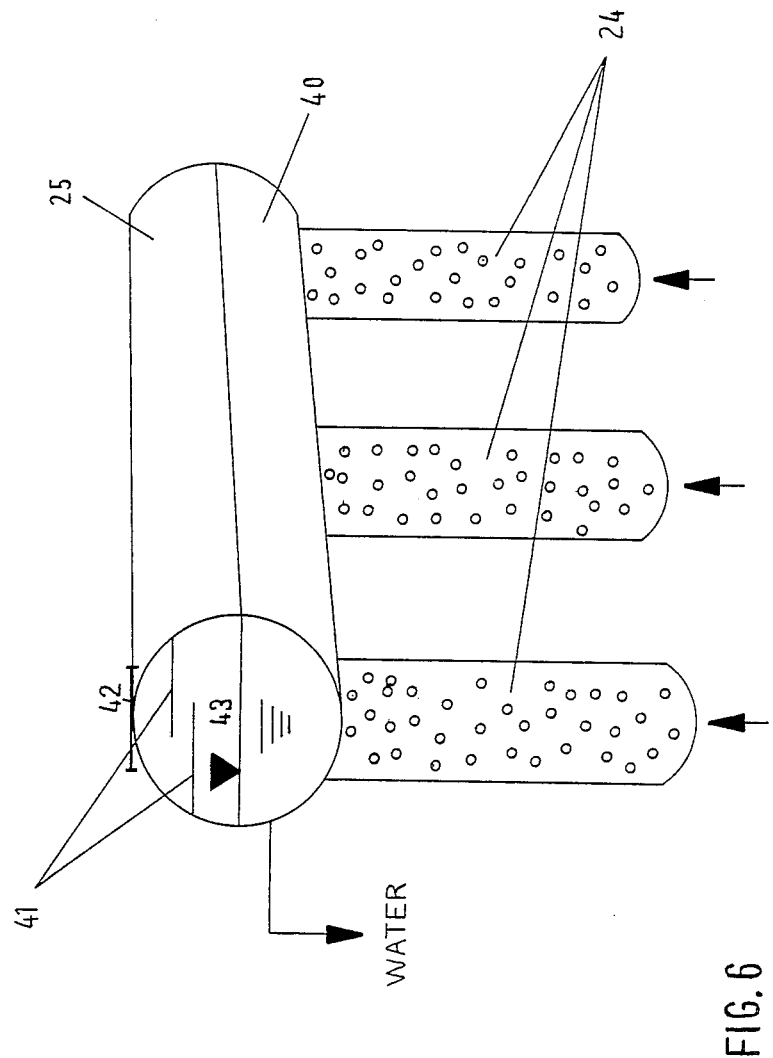
FIG. 6 shows a steam separator.

An embodiment of the water or steam separator 25 is illustrated in FIG. 6. The steam separator is made up of a horizontally aligned water-steam drum 40. One or more vertical boiler tubes 24 are connected to the bottom of the drum. The tube diameter is large enough to remove the quantity of steam generated in the liner cooling system. Baffles or diverting plates 41 may be built into the drum to prevent escape of water through steam outlet 42. In order to maintain appropriate pressure in the steam separator (and the water reservoir 23) a volume of nitrogen, referred to as a cushion is present in the freespace above the water surface.

The installation operates in the following manner:

The safety blow-off valve 26 is set for example at 2 bar. In normal operation the nitrogen cushion of $\geq 1.5$ bar and the setting of the safety blow-off valve 26 establish a pressure of between 1.5 bar and 2 bar at the uppermost point of the intermediate cooling loop 15 (water separator 25). The water separator 25 prevents the release of a water and steam mixture by the blow-off valve 26 upon the occurrence of bubble boiling and thus the rapid emptying of the intermediate cooling loop 15 without the complete utilization of the heat of evaporation.

Natural convection in the intermediate cooling loop initially takes place in the single phase zone. Up to a temperature of approx. 111° C. and a saturation pressure of 1.5 bar, the pressure in the water supply of the loop 15 is controlled by th nitrogen cushion at 1.5 bar. If the cooling water outlet temperature continues to rise, the corresponding saturation pressure determines the pressure in the water separator 25 (a check valve 28 provided on the water separator 25 for the $N_2$ supply, closes). At a water outlet temperature of 120° C.=2.0 bar saturation pressure boiling begins on the surface in the water separator 25. At a continued rise of the water outlet temperature to approx. 130° C., the onset of boiling is shifted to the lower end of the vertical boiling tube 24, which has a height of about 5 to 10 m. If the amount of heat supplied by the liner cooling system 13 is larger than the amount of heat discharged in the boiling tube 24 by evaporation, the onset of boiling is also displaced to the geodesically lower areas of the liner cooling system 13.

To increase the evaporation energy contained in the intermediate cooling loop 15, the water reservoir 23 is provided. The latter may have an open or closed configuration.

FIG. 5 shows a closed water reservoir 23. In this case the reservoir must be brought to the pressure of the water separator 25 by a connecting line 27. The geodesic height of the water reservoir 23 must be such that the water levels in the water separator 25 and the water reservoir 23 may establish themselves at the same height. In the downward direction, an extension of the water reservoir 23 to the lowest point of the liner cooling system 13 is useful and appropriate. A battery of standing pipes is used conveniently as the water reservoir. While FIG. 5 illustrates a vertical cylinder for a reservoir 23, any configuration may be used as long as the water level in the reservoir 23 is the same as that in the water or steam separator 25.

If the water reservoir has an open configuration, it must be at a geodesic height such that in case of a rise of the pressure in the intermediate cooling loop 15 to the actuating pressure of the safety blow-off valve 26, the blowing of the intermediate cooling loop 15 though the open water reservoir is prevented (not shown). With an actuating pressure of the safety blow-off valve 26 of for example 2 bar, the water level in the water reservoir must therefore be at least 10 m above the water level of the water separator 25. If these requirements relative to the geodesic height of a water reservoir cannot be satisfied (for example because reactor protective building is too low), a closed water reservoir must be used.

We claim:

1. A nuclear power plant comprising:
   a gas cooled high temperature reactor exhibiting a spherical fuel element core;
   a liner clad prestressed concrete pressure vessel defining a cavity surrounding said reactor;
   a plurality of heat exchangers for removal of operational heat located within said cavity;
   a plurality of auxiliary heat exchangers for removal of decay heat located within said cavity;
   a thermal insulating layer within said cavity disposed against said liner;
   a liner cooling pipe system including a plurality of liner cooling water pipes connected to said liner grouped into a plurality of liner cooling zones according to common topological location on said liner;
   means for serially connecting each liner cooling zone located in an elevated topological location to at least one non-elevated liner cooling zone;
   a first cooling water pump connected to a liner cooling pipe system input;
   a supplemental low capacity cooling water pump connected in parallel to said first cooling water pump;
   a pump bypass line connected in parallel to said first pump exhibiting a check valve responsive to said first pump;
   an intermediate heat exchanger connected to said first pump located above an upper edge of said pressure vessel;
   a nitrogen cushioned water reservoir connected to said line cooling pipe system input;
   a vertical boiling tube connected to a liner cooling pipe system return line and located at a higher elevation than said liner cooling pipe system;
   a nitrogen cushioned steam separator connected to said vertical boiling tube and said intermediate heat exchanger; and
   a safety blow-off valve connected to said steam separator.

2. A nuclear power plant according to claim 1, wherein said liner cooling pipe system is arranged to increase cooling water flow by natural convection as a result of higher concrete and liner temperatures.

3. A nuclear power plant according to claim 2, wherein said liner cooling pipe system is arranged so that a high heating range is permitted for cooling water during decay heat removal.

4. A nuclear power plant according to claim 1, wherein said liner cooling pipe system, intermediate cooling loop components are arranged to minimize nominal pressure losses.

5. A nuclear power plant according to claim 1, further comprising means for directly coupling said liner cooling zones.

6. A nuclear power plant according to claim 1, further comprising means for interconnecting said liner cooling zones for decay heat removal operation by short-circuiting of zone inlet and return lines by externally accessible valves.

7. A nuclear power plant according to claim 1, wherein said check valve opens when speed of said first pump drops below a predetermined level.

8. A nuclear power plant according to claim 1, wherein said check valve is passively controlled by a pressure difference applied to said first pump wherein said check valve is closed in normal operation, and is brought open by its own weight in case of a failure of said first pump.

9. A nuclear power plant according to claim 1, wherein said check valve is passively controlled by a pressure difference applied to the cooling water pump, wherein said check valve is closed in normal operation by a difference in pressure and is opened in case of a pump failure by release of a prestressed spring.

10. A nuclear power plant according to claim 1, wherein thermal resistance of the thermal insulating layer is optimized relative to a maximum permissible temperature of the liner for a given heat removal capacity of the liner cooling system form the decay heat removal operation, affecting said fuel elements and reaction installations.

11. A nuclear power plant according to claim 10, wherein said liner cooling system is optimized in view of maximum removal of the decay heat by natural convection and minimizing of liner temperature by parameters of cooling tube diameter and spacing of the cooling pipes.

12. A nuclear power plant according to claim 1, wherein said blow-off valve has an actuating pressure correlated to pressure in said steam separator nitrogen cushion so that upon failure of said intermediate heat exchanger, removal of heat from an intermediate cooling loop to a predetermined temperature is effected in a single phase and when saturation pressure in said steam separator actuates said blow-off valve effects a two-phase cooling.

13. A nuclear power plant according to claim 12, wherein said water reservoir has an open configuration and is located geodesically high enough so that in case of a rise of pressure in the intermediate cooling loop to said blow-off valve actuating pressure, a blow-off through said water reservoir does not occur.

14. A nuclear power plant according to claim 12, further comprising a line connecting said steam separator and said reservoir wherein said water reservoir has a closed configuration and has geodesic height so that an equal water level is established in the steam separator and said water reservoir.

15. A nuclear power plant according to claim 1, wherein said liner cooling pipe system is arranged so that a high heating range is permitted for cooling water during decay heat removal.

16. A nuclear power plant according to claim 1, wherein said liner cooling system is optimized in view of maximum removal of the decay heat by natural convection and minimizing of liner temperature by parameters of cooling tube diameter and spacing of the cooling pipes.

* * * * *